Nov. 10, 1942.   H. C. DOANE   2,301,860

DUAL INERTIA MEMBER

Filed Dec. 7, 1939

Inventor
Harry C. Doane
By
Blackmore, Lucas & Flint
Attorneys

Patented Nov. 10, 1942

2,301,860

UNITED STATES PATENT OFFICE 2,301,860

DUAL INERTIA MEMBER

Harry C. Doane, Flint, Mich., assignor to General Motors Corporation, Detroit, Mich., a corporation of Delaware Application December 7, 1939, Serial No. 308,034

3 Claims. (Cl. 73—151)

This invention relates to ammeters and has particular reference to the type of ammeters used on the instrument panel of an automotive vehicle.

When a voltage regulator is used in connection with a generator and ammeter, or so-called charge indicator—as in the conventional electrical system of an automobile—there results at times a fluctuating current in the ammeter or charge indicator circuit. This fluctuation is caused by the rapid opening and closing of the regulator contacts. The varying forces produced by this current cause the charge indicator pointer to swing violently from side to side. This action is not generally understood by the public, and is often construed as an indication of trouble with the electrical system and is therefore very annoying to the driver.

The past practice has been to minimize this erratic action by fastening to the shaft which carries the pointer a wheel having sufficient inertia to resist the rapid torque pulsations. In some instances the wheel has not been fastened to the shaft, but left free to turn, resistive action thus being obtained from the inertia of the wheel and its frictional contact with the shaft. However, with either or both arrangements in combination, there are still critical frequencies at which the magnetic forces synchronize with the wheel and pointer assembly, so that effective dampening is not produced.

The object of the construction shown herein is to produce dampening over a greater range of frequencies by causing two or more resistive forces to be out of phase with each other, thus preventing synchronization. This is accomplished in this specific design by the use of two loose wheels, each having a different ratio of mass to its frictional contact with the pivot shaft. One wheel is assembled directly over the small diameter of the shaft in such a manner that it turns freely upon the shaft. The other wheel is assembled over a hub of larger diameter than the shaft. This wheel turns freely on the hub, which is pressed on or otherwise fixed to the shaft. Because of the difference in frictional contact, and the fact that in this particular design the masses of the two wheels are substantially the same, they do not respond equally—thus synchronization is prevented. It is understood, of course, that although only two wheels are used, variation in the construction of the instruments may require the use of more than two wheels in combination, as well as a difference in the masses of the wheels and their frictional contact.

The present invention is an improvement over that disclosed in the patent to Bacon 2,047,763.

On the drawing

Figure 1:
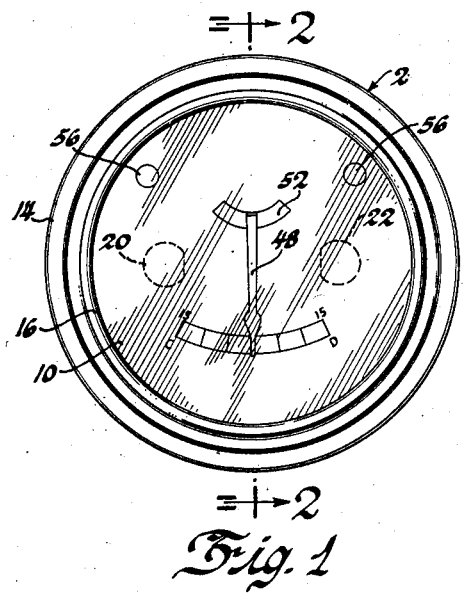
Figure 1 is a view in elevation of the ammeter.
Figure 2:
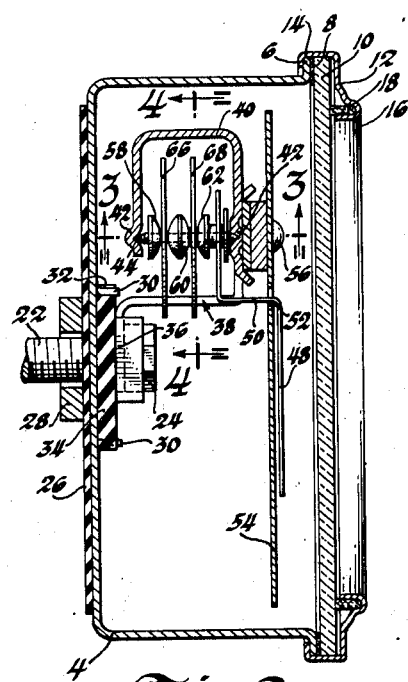
Figure 2 is an enlarged sectional view on the line 2—2 of Figure 1.

Referring to the drawing, the ammeter is indicated as a whole at 2. The ammeter is enclosed in a cup-shaped casing 4 having an outwardly turned edge rim 6. A gasket 8 fits on the rim and a glass 10 is positioned on the gasket. The usual bezel or ring 12 fits over the glass and has its edge formed into U-shape as indicated at 14 and this U-shaped edge 14 is positioned under the flange 6 and rigidly holds the parts 4, 8, and 10 together.

The bezel has a U-shaped internal periphery 16 with the washer or gasket 18 positioned in the U-shaped part and bearing against the glass 10.

The bottom of the cup 4 has two openings therein in order to enable the contact studs 20 and 22 to pass therethrough. The studs have the heads 24 inside the casing 4 and the threaded terminals project from the rear of the casing. The bottom of the casing has an insulating strip or a disc 26 positioned thereover and a washer 28 is passed over each stud 22. The usual nuts (not shown) are screwed onto the threaded ends 20 and 22 and are adapted to hold the usual terminals in place.

The bottom of the casing 4 has the upturned ears 30 which fit into recesses 32 in the sides of the insulating base piece 34 which rests on the bottom of the casing 4.

Over the base piece 34 there are received the feet 36 of a frame indicated as a whole at 38. The feet 36 are held in place by the heads of the contact bolts 20 and 22 which pass through openings in the feet. The current which moves the pointer passes in at one contact 20, through the frame 38, and out at the other contact 22. The current affects the armature secured to the shaft 44 between the pointer 48 and the upper end bearing 42.

The frame 38 has the upper part bent to a U-shaped configuration as indicated at 40 and the legs of the U at opposite points are prick punched, as indicated at 42, to form bearings for a shaft 44, the ends of which are pointed as indicated at 46, in order that the ends may be received in the prick punched parts 42. The shaft has secured at one end thereof the pointer 48. The pointer has the intermediate bend 50 which projects through an opening 52 in the dial 54, secured by means of the rivets 56 to one leg of the U-shaped part 40 of the frame 38.

Figure 3:
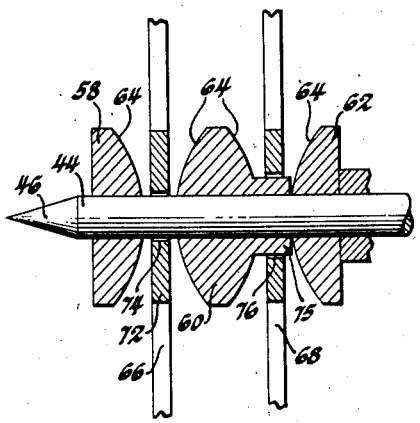
Figure 3 is an enlarged sectional detailed view on the line 3—3 of Figure 2.
Figure 4:
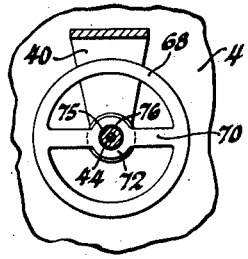
Figure 4 is a detailed view on the line 4—4 of Figure 2.

Referring to Figure 3, the shaft 44 has secured thereon the spacers 58, 60, and 62. The adjacent faces of the spacers 58, 60 and 62 are rounded as indicated at 64 and the purpose of this rounded surface is to reduce friction between the lateral faces of the inertia or equalizing members 66 and 68 and the faces of the spacers 58, 60, and 62. The adjacent spacers 58 and 60 are spaced far enough apart to enable the inertia member 66 to be positioned therebetween. The inertia members 66 and 68 are of the shape shown in Figure 4 and comprise a ring having the diametral piece 70 having an enlarged part 72 provided with an opening 74 through which the shaft 44 passes. The opening is larger than the shaft 44 to enable the free intermovement of the two.

The spacer 60 has the double rounded surfaces 64 and also has an extension 75 considerably larger than the shaft and over this extension 75 there is received the inertia member 68, the opening 76 of which is larger than the opening 74 on the inertia member 66. In Figure 3 it will be seen that the frictional engagement between the shaft 44 and the inertia member 66 is less than the frictional engagement between the inertia member 68 and the enlargement 75. Therefore, as the shaft 44 rotates in response to fluctuations in the electric current, the inertia members 66 and 68 will not move in unison and any unusual fluctuations which may be caused due to circumstances as outlined in the statement of invention will not cause excessive fluctuations in the pointer, but the lack of synchronization of the inertia will bring about a regular and even pointer movement.

I claim:

1. In an electrical measuring instrument, a single shaft, means in the instrument turnably to mount the shaft, a pointer secured to the shaft and movable therewith, an inertia member freely turnable on the shaft, a second member freely turnable on the shaft, the diameter on which the second inertia member turns being larger than the diameter on which the first inertia member turns, a spacer between said inertia members, spacers on the outside of said inertia members, said spacers secured to the shaft, said inertia members stabilizing the movement of the shaft.

2. In an electrical measuring instrument, a shaft, means in the instrument turnably to mount the shaft, a pointer secured to the shaft and movable therewith, spacers rigidly mounted on the shaft, an inertia member turnably mounted on the shaft between two of the spacers, an extension, said extension being a part of one of the spacers and surrounding the shaft, a second inertia member turnably mounted on the extension and between two of the spacers, said inertia members stabilizing the movement of the shaft.

3. In an electrical measuring instrument, a shaft, means in the instrument turnably to mount the shaft, a pointer secured to the shaft and movable therewith, three spacers rigidly mounted on the shaft and being spaced from each other, an inertia member turnably mounted on the shaft between two adjacent spacer members, an extended diametral part formed on one of the spacer members and surrounding the shaft, a second inertia member turnably mounted on said diametral part and between two adjacent spacers, the faces of the said spacers adjacent said inertia members being rounded to reduce lateral friction, the masses of both of said inertia members being substantially the same.

HARRY C. DOANE.